US008922854B2

(12) United States Patent  
Hyoki

(10) Patent No.: US 8,922,854 B2
(45) Date of Patent: Dec. 30, 2014

(54) IMAGE READING DEVICE AND IMAGE FORMING APPARATUS

(75) Inventor: Kenji Hyoki, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 555 days.

(21) Appl. No.: 13/116,773

(22) Filed: May 26, 2011

(65) Prior Publication Data

US 2012/0099169 A1   Apr. 26, 2012

(30) Foreign Application Priority Data

Oct. 21, 2010   (JP) .................................. 2010-236144

(51) Int. Cl.
| G03F 3/08 | (2006.01) |
| G03G 15/01 | (2006.01) |
| G03G 15/00 | (2006.01) |
| H04N 1/60 | (2006.01) |
| H04N 1/23 | (2006.01) |
| H04N 1/04 | (2006.01) |

(52) U.S. Cl.
CPC ........ *G03G 15/5062* (2013.01); *G03G 15/0189* (2013.01); *H04N 1/60* (2013.01); *H04N 1/23* (2013.01); *H04N 1/04* (2013.01)
USPC ............. 358/518; 358/2.1; 358/1.9; 358/461; 399/15

(58) Field of Classification Search
None
See application file for complete search history.

(56) References Cited

U.S. PATENT DOCUMENTS

| 5,553,167 | A | * | 9/1996 | Dowling ........................ 382/270 |
| 5,754,448 | A | * | 5/1998 | Edge et al. .................... 358/516 |
| 5,943,141 | A | * | 8/1999 | Tamura .......................... 358/461 |
| 6,008,907 | A | * | 12/1999 | Vigneau et al. ................ 358/1.9 |
| 6,108,442 | A | * | 8/2000 | Edge et al. .................... 382/167 |
| 6,246,484 | B1 | * | 6/2001 | Shimamura et al. ......... 358/1.12 |
| 6,538,770 | B1 | * | 3/2003 | Mestha .......................... 358/1.9 |
| 6,917,451 | B2 | * | 7/2005 | Waragai et al. ............... 358/461 |
| 7,027,157 | B2 | * | 4/2006 | Steinfield et al. ............. 356/425 |
| 7,027,182 | B1 | * | 4/2006 | Soler .............................. 358/1.9 |
| 7,515,310 | B2 | * | 4/2009 | Llewellyn et al. ............ 358/446 |
| 2001/0033395 | A1 | * | 10/2001 | Chizawa ....................... 358/461 |

(Continued)

FOREIGN PATENT DOCUMENTS

| JP | 2226966 A | 9/1990 |
| JP | 11205597 A | 7/1999 |

(Continued)

OTHER PUBLICATIONS

Communication dated Sep. 24, 2014, issued by the Japanese Patent Office in counterpart Application No. 2010236144.

*Primary Examiner* — King Poon
*Assistant Examiner* — Ted Barnes
(74) *Attorney, Agent, or Firm* — Sughrue Mion, PLLC

(57) ABSTRACT

An image reading device includes a light source, a light receiving unit, a generation unit, a white reference member, a color reference member, and a processing unit. The light source emits light to a recording medium on which an image is formed. The light receiving unit receives light reflected by the recording medium. The generation unit generates a light intensity value from the light received by the light receiving unit. The white reference member is used for color calibration for a white balance. The color reference member is used for color calibration to calibrate a predetermined color. The processing unit derives a correlation formula representing variation in characteristics of the white reference member, based on a light intensity value generated when light is emitted to the color reference member from the light source.

20 Claims, 10 Drawing Sheets

(56) References Cited

U.S. PATENT DOCUMENTS

| | | | |
|---|---|---|---|
| 2002/0122209 A1* | 9/2002 | Yoshida | 358/2.1 |
| 2002/0191229 A1* | 12/2002 | Tamamura | 358/461 |
| 2003/0016398 A1* | 1/2003 | Soeda | 358/461 |
| 2003/0043224 A1* | 3/2003 | Hasegawa et al. | 347/29 |
| 2004/0042807 A1* | 3/2004 | Nakayama | 399/49 |
| 2005/0185065 A1* | 8/2005 | Goris et al. | 348/223.1 |
| 2005/0237548 A1* | 10/2005 | Suzuki | 358/1.9 |
| 2006/0001925 A1* | 1/2006 | Tatarczyk | 358/509 |
| 2006/0098241 A1* | 5/2006 | Cheong et al. | 358/463 |
| 2006/0139700 A1* | 6/2006 | Murakami et al. | 358/474 |
| 2006/0227386 A1* | 10/2006 | Nuuja et al. | 358/406 |
| 2006/0268346 A1* | 11/2006 | van Os | 358/3.26 |
| 2007/0019258 A1* | 1/2007 | Hattori | 358/518 |
| 2007/0177168 A1* | 8/2007 | Nakazawa | 358/1.4 |
| 2007/0177229 A1* | 8/2007 | Cessel et al. | 358/504 |
| 2007/0223061 A1* | 9/2007 | Tanaka et al. | 358/497 |
| 2007/0223066 A1* | 9/2007 | Liu et al. | 358/506 |
| 2007/0258102 A1* | 11/2007 | Bielak et al. | 358/1.9 |
| 2007/0285730 A1* | 12/2007 | Suzuki et al. | 358/3.24 |
| 2008/0013077 A1* | 1/2008 | Orelli et al. | 356/73 |
| 2008/0013128 A1* | 1/2008 | Baker et al. | 358/296 |
| 2008/0056737 A1* | 3/2008 | Flemming et al. | 399/15 |
| 2008/0100879 A1* | 5/2008 | Lee | 358/461 |
| 2008/0112017 A1* | 5/2008 | Nagasaka | 358/461 |
| 2008/0137107 A1* | 6/2008 | Futami | 358/1.4 |
| 2008/0170273 A1* | 7/2008 | Hashizume | 358/461 |
| 2008/0174763 A1* | 7/2008 | Ehbets et al. | 356/51 |
| 2008/0174788 A1* | 7/2008 | Ehbets et al. | 356/614 |
| 2008/0180514 A1* | 7/2008 | Sekizawa et al. | 347/252 |
| 2009/0033954 A1* | 2/2009 | Bray | 358/1.9 |
| 2009/0059319 A1* | 3/2009 | Aoki et al. | 358/496 |
| 2009/0073469 A1 | 3/2009 | Kita et al. | |
| 2009/0122367 A1* | 5/2009 | Murakami et al. | 358/498 |
| 2009/0129803 A1* | 5/2009 | Sato | 399/54 |
| 2009/0180157 A1* | 7/2009 | Shimatani | 358/474 |
| 2010/0066857 A1* | 3/2010 | Ovsiannikov | 348/223.1 |
| 2010/0128099 A1* | 5/2010 | Evans | 347/171 |
| 2010/0171971 A1* | 7/2010 | Hoshii | 358/1.9 |
| 2011/0249302 A1* | 10/2011 | Tanaka et al. | 358/461 |

FOREIGN PATENT DOCUMENTS

| | | |
|---|---|---|
| JP | 3690206 B2 | 3/2001 |
| JP | 2001086297 A | 3/2001 |
| JP | 200969606 A | 4/2009 |

* cited by examiner

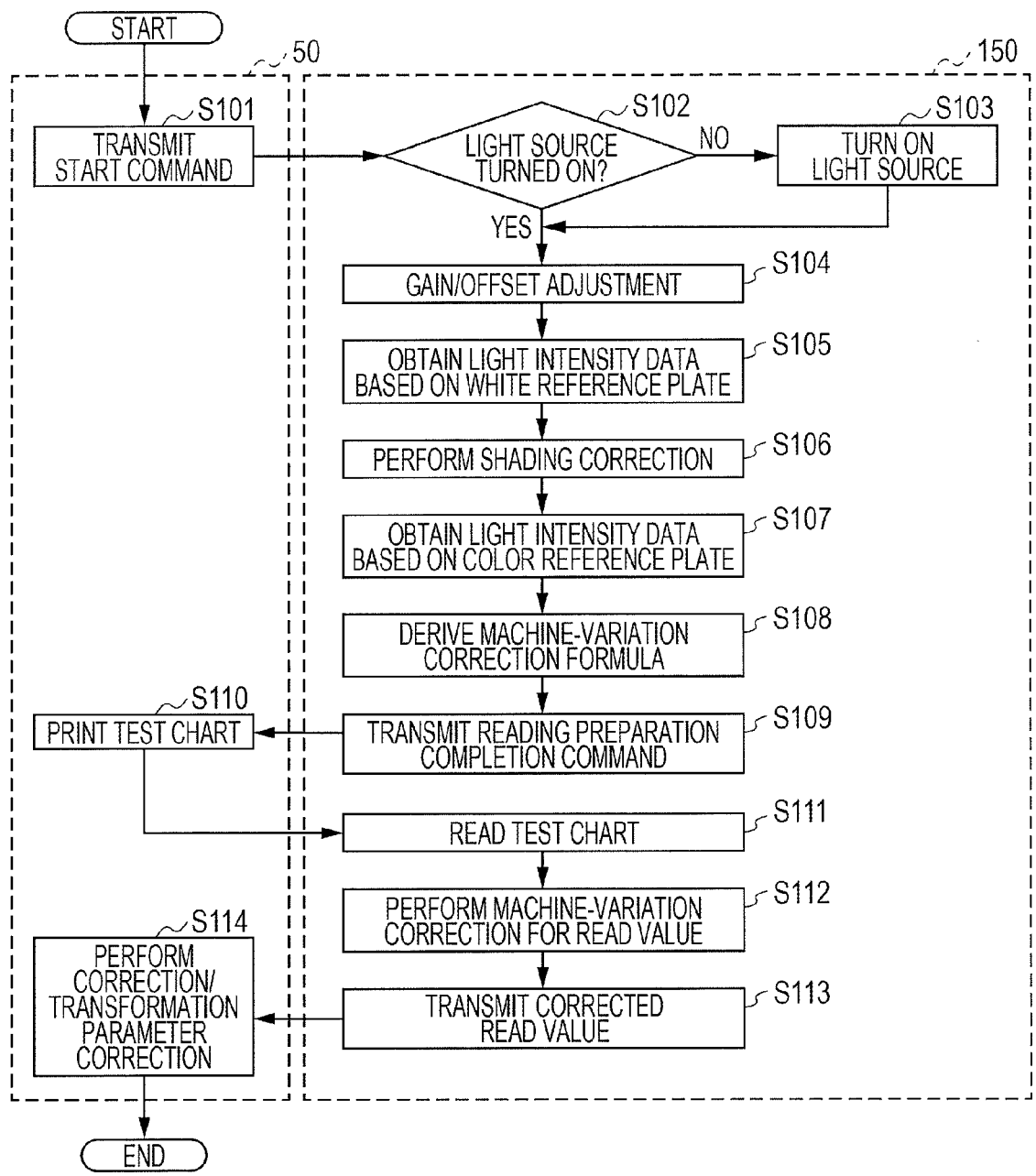

IMAGE READING DEVICE AND IMAGE FORMING APPARATUS

CROSS-REFERENCE TO RELATED APPLICATIONS

This application is based on and claims priority under 35 USC 119 from Japanese Patent Application No. 2010-236144 filed Oct. 21, 2010.

BACKGROUND (i) Technical Field

The present invention relates to an image reading device and an image forming apparatus.

(ii) Related Art

In general, image reading devices that read information regarding an image formed on a sheet of paper have been used as copying machines, facsimile machines, scanners as input devices for computers, and the like. This kind of image reading device is configured to read an image on a sheet of paper by emitting light to the sheet of paper from a light source located in a paper transport path and by receiving light reflected from the sheet of paper by using an image sensor.

SUMMARY

According to an aspect of the invention, there is provided an image reading device including a light source, a light receiving unit, a generation unit, a white reference member, a color reference member, and a processing unit. The light source emits light to a recording medium on which an image is formed. The light receiving unit receives light reflected by the recording medium. The generation unit generates a light intensity value from the light received by the light receiving unit. The white reference member is used for color calibration for a white balance. The color reference member is used for color calibration to calibrate a predetermined color. The processing unit derives a correlation formula representing variation in characteristics of the white reference member, based on a light intensity value generated when light is emitted to the color reference member from the light source.

BRIEF DESCRIPTION OF THE DRAWINGS

Exemplary embodiment(s) of the present invention will be described in detail based on the following figures, wherein:

FIG. 8 is a flowchart illustrating a first example of correcting a value read by the image reading device using a machine-variation correction formula;

DETAILED DESCRIPTION

An exemplary embodiment of the present invention will be described in detail hereinafter with reference to the accompanying drawings.

Description of Image Forming Apparatus

Figure 1:
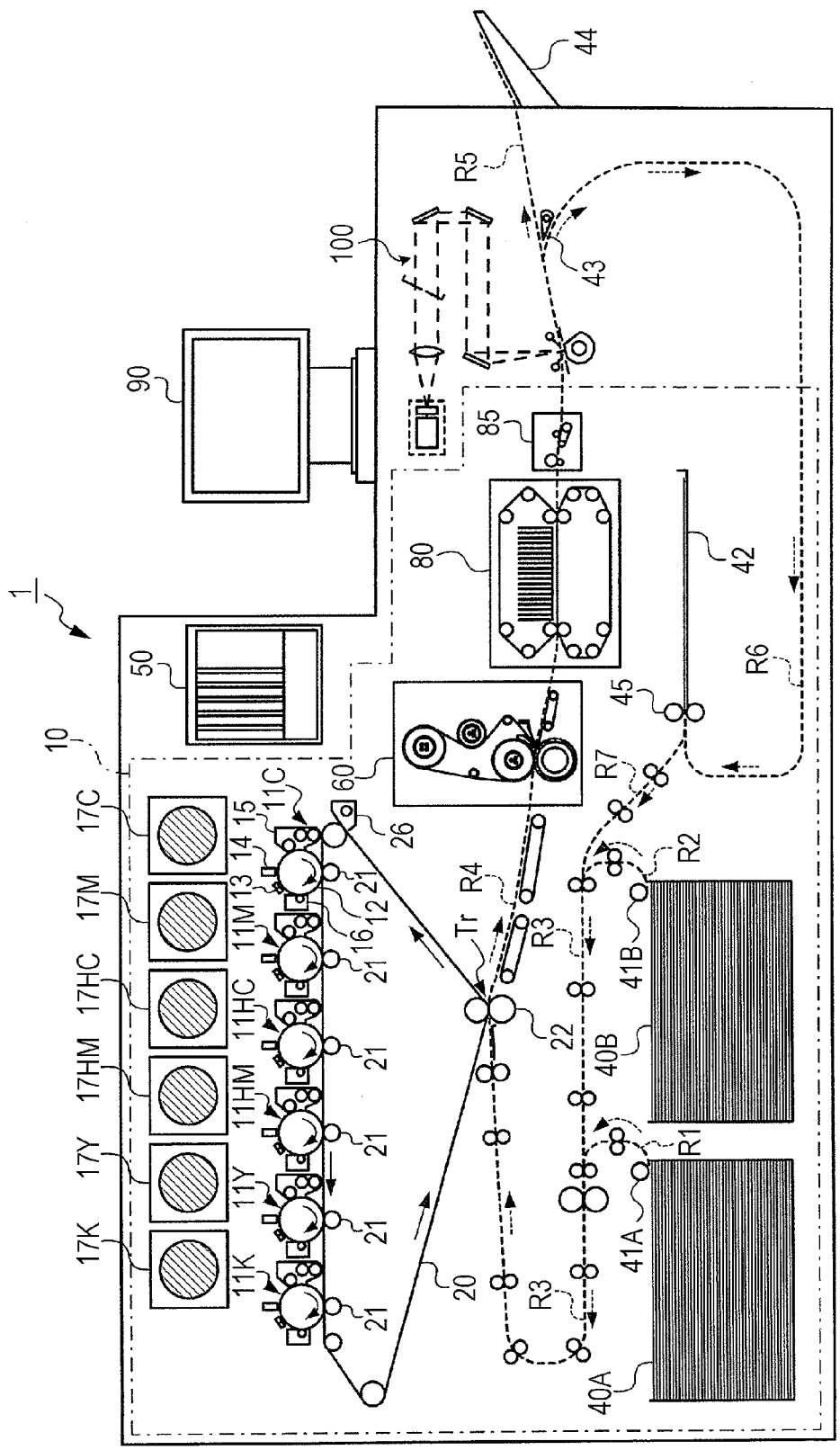
FIG. 1 illustrates an image forming apparatus including an image reading device according to an exemplary embodiment.

FIG. 1 illustrates an image forming apparatus 1 including an image reading device 100 according to this exemplary embodiment.

The image forming apparatus 1 may be a so-called "tandem" color printer, and includes an image forming device 10, a controller 50, a user interface (UI) unit 90, and an image reading device 100 as an example of a reading unit. The image forming device 10 forms an image on a sheet of paper as an example of a recording medium in accordance with image data. The controller 50 controls the overall operation of the image forming apparatus 1, and executes processes such as communicating with a personal computer (PC) and the like and performing image processing on image data. The UI unit 90 receives an operation input from a user, and displays various types of information to the user. The image reading device 100 reads the image formed on the sheet of paper by the image forming device 10 to adjust the image on the sheet of paper.

Description of Image Forming Device

The image forming device 10 may be a functional device that forms an image using, for example, an electrophotographic method. The image forming device 10 includes six image forming units 11C, 11M, 11HC, 11HM, 11Y, and 11K (hereinafter referred to as "image forming units 11") as an example of toner image forming units arranged in parallel to one another, an intermediate transfer belt 20 onto which toner images of the respective colors formed on photoconductor drums 12 of the image forming units 11 are transferred, and first-transfer rollers 21 that transfer ("first-transfer") the toner images of the respective colors formed by the image forming units 11 onto the intermediate transfer belt 20. The image forming device 10 further includes a second-transfer roller 22, and a fixing unit 60 as an example of a fixing device. The second-transfer roller 22 collectively transfers ("second-transfers") the toner images of the respective colors, which have been transferred onto the intermediate transfer belt 20 and which have been superimposed on one another, onto a sheet of paper. The fixing unit 60 fixes the second-transferred toner images of the respective colors onto the sheet of paper. An area where the second-transfer roller 22 is arranged and where the toner images of the respective colors on the intermediate transfer belt 20 are second-transferred onto a sheet of paper is hereinafter referred to as a "second-transfer area Tr".

The image forming device 10 further includes a cooling unit 80 as an example of a cooler, and a curl correction unit 85. The cooling unit 80 cools the toner images of the respective colors fixed onto the sheet of paper by the fixing unit 60 to facilitate fixing of the toner images of the respective colors onto the sheet of paper. The curl correction unit 85 corrects a curl of the sheet of paper. In the image forming apparatus 1 according to this exemplary embodiment, the intermediate transfer belt 20, the first-transfer rollers 21, and the second-transfer roller 22 form a transferring unit that transfers a toner image onto a sheet of paper.

Description of Image Forming Unit

Each of the image forming units 11 includes functional members. Examples of the functional members include a photoconductor drum 12 on which an electrostatic latent image is formed and then a toner image of the corresponding color is formed, a charging unit 13, an exposure unit 14, a developing unit 15, and a cleaner 16. The charging unit 13 charges the surface of the photoconductor drum 12 with a predetermined potential. The exposure unit 14 exposes the photoconductor drum 12 charged by the charging unit 13 to light based on image data. The developing unit 15 develops the electrostatic latent image formed on the photoconductor drum 12 with toner of the corresponding color. The cleaner 16 cleans the surface of the photoconductor drum 12 after the transfer operation.

The developing units 15 of the respective image forming units 11 are coupled to toner containers 17C, 17M, 17HC, 17HM, 17Y, and 17K (hereinafter referred to as "toner containers 17") that store toners of the respective colors via toner transport paths (not illustrated). The developing units 15 are replenished with toners of the respective colors from the toner containers 17 by using replenishing screws (not illustrated) provided in the toner transport paths.

The image forming units 11 have substantially similar configurations, except for the toners contained in the developing units 15, and individually form toner images of cyan (C) color, magenta (M) color, high-chroma cyan (HC) color, high-chroma magenta (HM) color, yellow (Y) color, and black (K) color. Here, the HC color has a cyan-based hue and is a cyan color having a lighter color tone and a relatively higher chroma than the C color, and the HM color has a magenta-based hue, and is a magenta color having a lighter color tone and a relatively higher chroma than the M color.

Description of Fixing Unit

Figure 2:
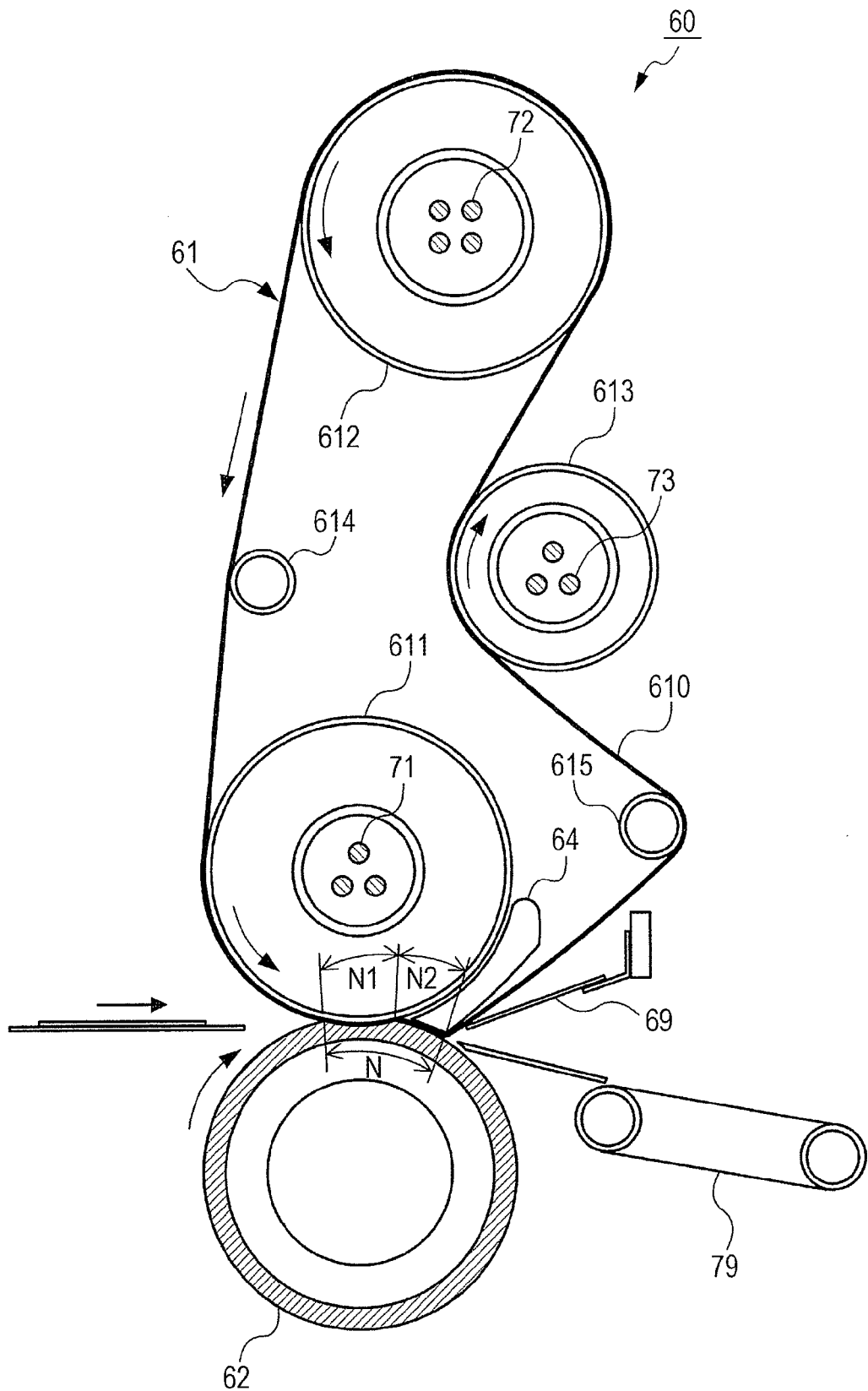
FIG. 2 is a cross-sectional view illustrating the configuration of a fixing unit.

FIG. 2 is a cross-sectional view illustrating the configuration of the fixing unit 60.

The fixing unit 60 includes a fixing belt module 61 that heats a sheet of paper, and a pressing roller 62 configured to be capable of coming into and out of contact with the fixing belt module 61.

The fixing belt module 61 includes a fixing belt 610, a fixing roller 611, an internal heating roller 612, and an external heating roller 613. The fixing roller 611 rotates while stretching the fixing belt 610, and heats the fixing belt 610 from inside at a nip part N that is an area where the fixing belt module 61 and the pressing roller 62 are pressed against each other (or are brought into pressure contact with each other). The internal heating roller 612 heats the fixing belt 610 while stretching the fixing belt 610 from inside. The external heating roller 613 heats the fixing belt 610 while stretching the fixing belt 610 from outside. The fixing belt module 61 further includes a stretching roller 614, a separation pad 64, and a stretching roller 615. The stretching roller 614 serves to stretch the fixing belt 610 between the fixing roller 611 and the internal heating roller 612 (on the upstream side of the nip part N). The separation pad 64 is arranged at a position that is in a downstream area in the nip part N and that is near the fixing roller 611. The stretching roller 615 serves to stretch the fixing belt 610 on the downstream side of the nip part N. The fixing roller 611, the internal heating roller 612, and the external heating roller 613 include a halogen heater 71, a halogen heater 72, and a halogen heater 73, respectively, as heat sources.

Description of Paper Transport System in Image Forming Apparatus

The image forming device 10 also includes a paper transport system. The paper transport system includes plural (in this exemplary embodiment, two) paper containers 40A and 40B each of which contains a stack of sheets of paper, feed rollers 41A and 41B that feed the sheets of paper atop the stacks of paper in the paper containers 40A and 40B and that transport the fed sheets of paper, a first transport path R1 along which a sheet of paper is transported from the paper container 40A, and a second transport path R2 along which a sheet of paper is transported from the paper container 40B. The image forming device 10 further includes a third transport path R3 along which a sheet of paper fed from the paper container 40A and a sheet of paper fed from the paper container 40B are transported to the second-transfer area Tr. In addition, the image forming device 10 also includes a fourth transport path R4 and a fifth transport path R5. A sheet of paper onto which the toner images of the respective colors have been transferred in the second-transfer area Tr is transported along the fourth transport path R4 to the fixing unit 60, the cooling unit 80, the curl correction unit 85, and the image reading device 100. A sheet of paper conveyed from the image reading device 100 is transported along the fifth transport path R5 to a paper catch tray 44 provided in a discharge unit of the image forming apparatus 1.

Transport rollers and transport belts are arranged along the first to fifth transport paths R1 to R5, and sequentially transport delivered sheets of paper.

Description of Duplex Printing Transport System

The image forming device 10 also includes a duplex printing transport system. The duplex printing transport system includes an intermediate paper container 42, a sixth transport path R6, and a seventh transport path R7. The intermediate paper container 42 temporarily holds a sheet of paper obtained after the toner images of the respective colors have been fixed onto a first side of the sheet of paper by the fixing unit 60. A sheet of paper conveyed from the image reading device 100 is transported along the sixth transport path R6 to the intermediate paper container 42. The sheet of paper contained in the intermediate paper container 42 is transported along the seventh transport path R7 to the third transport path R3. The image forming device 10 further includes a directing mechanism unit 43 and a feed roller 45. The directing mechanism unit 43 is arranged downstream of the image reading device 100 in the paper transport direction, and selectively directs a sheet of paper into the fifth transport path R5 configured to transport a sheet of paper to the paper catch tray 44 or the sixth transport path R6 configured to transport a sheet of paper to the intermediate paper container 42. The feed roller 45 feeds a sheet of paper contained in the intermediate paper container 42, and transports the sheet of paper to the seventh transport path R7.

Description of Image Forming Operation

Next, a basic image forming operation of the image forming apparatus 1 according to this exemplary embodiment will be described with reference to FIGS. 1 and 2.

Each of the image forming units 11 of the image forming device 10 forms a toner image of a corresponding one of the C color, the M color, the HC color, the HM color, the Y color, and the K color by an electrophotographic process using the functional members described above. The toner images of the respective colors formed by the image forming units 11 are sequentially first-transferred onto the intermediate transfer belt 20 using the first-transfer rollers 21, and are superimposed on one another to form a composite toner image. In accordance with the movement of the intermediate transfer belt 20 (in the arrow direction), the composite toner image on the intermediate transfer belt 20 is transported to the second-transfer area Tr where the second-transfer roller 22 is arranged.

In the paper transport system, the feed rollers 41A and 41B rotate in time with the timing at which each of the image forming units 11 starts image formation, and a sheet of paper is fed from one of the paper containers 40A and 40B which is specified using, for example, the UI unit 90 by the corresponding one of the feed rollers 41A and 41B. The sheet of paper fed by the feed roller 41A or 41B is transported along the first transport path R1 or the second transport path R2 and along the third transport path R3, and reaches the second-transfer area Tr.

In the second-transfer area Tr, the composite toner image held on the intermediate transfer belt 20 is collectively second-transferred onto the sheet of paper by a transfer electric field formed by the second-transfer roller 22.

After that, the sheet of paper onto which the composite toner image has been transferred is separated from the intermediate transfer belt 20, and is transported to the nip part N of the fixing unit 60 along the fourth transport path R4. The unfixed toner image on the surface of the sheet of paper that passes through the nip part N is fixed onto the sheet of paper by applying pressure and heat in the roller nip part N1.

Specifically, in the fixing unit 60 according to this exemplary embodiment, heat to be applied in the roller nip part N1 is supplied by the fixing belt 610. The fixing belt 610 is heated by the heat supplied through the fixing roller 611 from the halogen heater 71 arranged in the fixing roller 611, the heat supplied through the internal heating roller 612 from the halogen heater 72 arranged in the internal heating roller 612, and the heat supplied through the external heating roller 613 from the halogen heater 73 arranged in the external heating roller 613. Since heat energy is supplied not only from the fixing roller 611 but also from the internal heating roller 612 and the external heating roller 613, a sufficient amount of heat may be supplied in the roller nip part N1 even if the process speed is high.

After passing through the roller nip part N1, the sheet of paper is transported to a separation pad nip part N2. The separation pad nip part N2 is configured such that the separation pad 64 is pressed to the pressing roller 62 to bring the fixing belt 610 into pressure contact with the pressing roller 62. Accordingly, the roller nip part N1 is shaped into a curve that is convex downward by the curvature of the fixing roller 611, whereas the separation pad nip part N2 is shaped into a curve that is convex upward by the curvature of the pressing roller 62.

Thus, the travel direction of the sheet of paper heated and pressed under the curvature of the fixing roller 611 in the roller nip part N1 is changed by curvature directed in the opposite direction by the pressing roller 62 in the separation pad nip part N2. In this case, micro-slip between the toner image on the sheet of paper and the surface of the fixing belt 610 may reduce the adhesion between the toner image and the fixing belt 610, resulting in the sheet of paper being easily separated from the fixing belt 610. Accordingly, the separation pad nip part N2 is also used in a preparation step to ensure reliable separation in the final separation step.

At the exit of the separation pad nip part N2, the fixing belt 610 is transported so as to be wrapped around the separation pad 64. Thus, the direction in which the fixing belt 610 is transported rapidly changes. Since the fixing belt 610 moves along the outer side surface of the separation pad 64, the fixing belt 610 greatly bends. The sheet of paper with the adhesion to the fixing belt 610 having been reduced in the separation pad nip part N2 is therefore separated from the fixing belt 610 due to the stiffness of the sheet of paper.

The travel direction of the sheet of paper separated from the fixing belt 610 is guided by a separation guide plate 69 arranged downstream of the separation pad nip part N2. The sheet of paper guided by the separation guide plate 69 is then transported to the cooling unit 80 by a paper discharge belt 79, and is cooled by the cooling unit 80. Then, the curl of the sheet of paper is corrected by the curl correction unit 85, and an image recorded on the sheet of paper is read by the image reading device 100. Then, after the image reading device 100, the sheet of paper is directed to the fifth transport path R5 for single sided, or simplex, printing by the directing mechanism unit 43, and is transported to the paper catch tray 44.

The toner adhered on the photoconductor drums 12 after the first-transfer process (first-transfer residual toner) and the toner adhered on the intermediate transfer belt 20 after the second-transfer process (second-transfer residual toner) are removed by the cleaners 16 and a belt cleaner 26, respectively.

In double-sided, or duplex, printing, after the image reading device 100, a sheet of paper obtained after a fixed image has been formed on a first side of the sheet of paper by using the process described above is directed to the sixth transport path R6 by the directing mechanism unit 43, and is transported to the intermediate paper container 42 along the sixth transport path R6. Then, the feed roller 45 again rotates in time with the timing at which each of the image forming units 11 starts image formation on a second side of the sheet of paper, and the sheet of paper is fed from the intermediate paper container 42. The sheet of paper fed by the feed roller 45 is transported along the seventh transport path R7 and the third transport path R3, and reaches the second-transfer area Tr.

In the second-transfer area Tr, toner images of the respective colors held on the intermediate transfer belt 20 in a similar way to that for the first side are collectively second-transferred onto the second side of the sheet of paper by a transfer electric field formed by the second-transfer roller 22.

Then, the sheet of paper with the toner images transferred onto both sides thereof is fixed by the fixing unit 60 in a manner similar to that for the first side, and is cooled by the cooling unit 80. Further, the curl of the sheet of paper is corrected by the curl correction unit 85, and an image recorded on the sheet of paper is read by the image reading device 100. Then, after the image reading device 100, the sheet of paper is directed to the fifth transport path R5 by the directing mechanism unit 43, and is transported toward the paper catch tray 44.

In this way, the image forming apparatus 1 repeatedly executes the image forming process over a number of cycles corresponding to the number of prints.

Description of Image Reading Device

Figure 3:
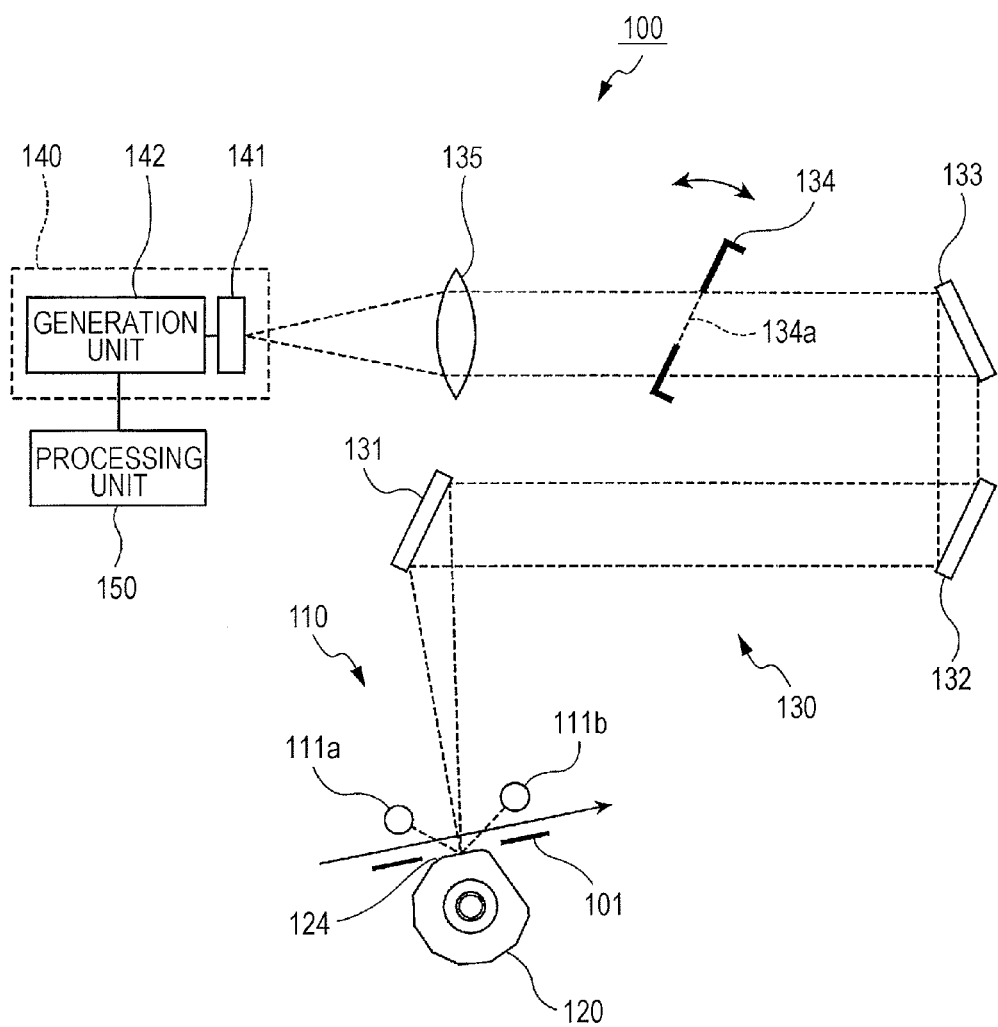
FIG. 3 illustrates the image reading device according to this exemplary embodiment.

FIG. 3 illustrates the image reading device 100 according to this exemplary embodiment.

In this exemplary embodiment, the image reading device 100 is an example of a reading unit that reads an image on a sheet of paper onto which a toner image has been fixed by the fixing unit 60. The image reading device 100 includes a light source 110 that emits light to a sheet of paper on which an image is formed, a reading accuracy measurement unit 120 having various measurement surfaces for adjusting the image reading device 100, an optical system 130 that directs light reflected by the sheet of paper or light reflected by the reading accuracy measurement unit 120, a charge coupled device (CCD) sensor 140 that converts the light directed by the optical system 130 into light intensity data, and a processing unit 150 that derives a correlation formula representing variation in characteristics of a white reference plate, which will be described in detail below.

In this exemplary embodiment, the light source 110 may be composed of a pair of straight-tube xenon fluorescent lamps 111a and 111b. The light source 110 emits light to a sheet of paper guided by a guide surface 101 and passing over a transport surface to generate reflected light as information regarding an image formed on the sheet of paper.

In this exemplary embodiment, the light source 110 composed of a pair of xenon fluorescent lamps 111a and 111b may reduce the changes in the illuminance of light emitted to a sheet of paper even if the sheet of paper is transported with the sheet of paper being inclined with respect to the transport surface. A single xenon fluorescent lamp would cause a change in the illuminance of light emitted to a sheet of paper to be likely to occur when the sheet of paper is inclined, leading to the possibility of the image being not correctly read.

Figure 4:
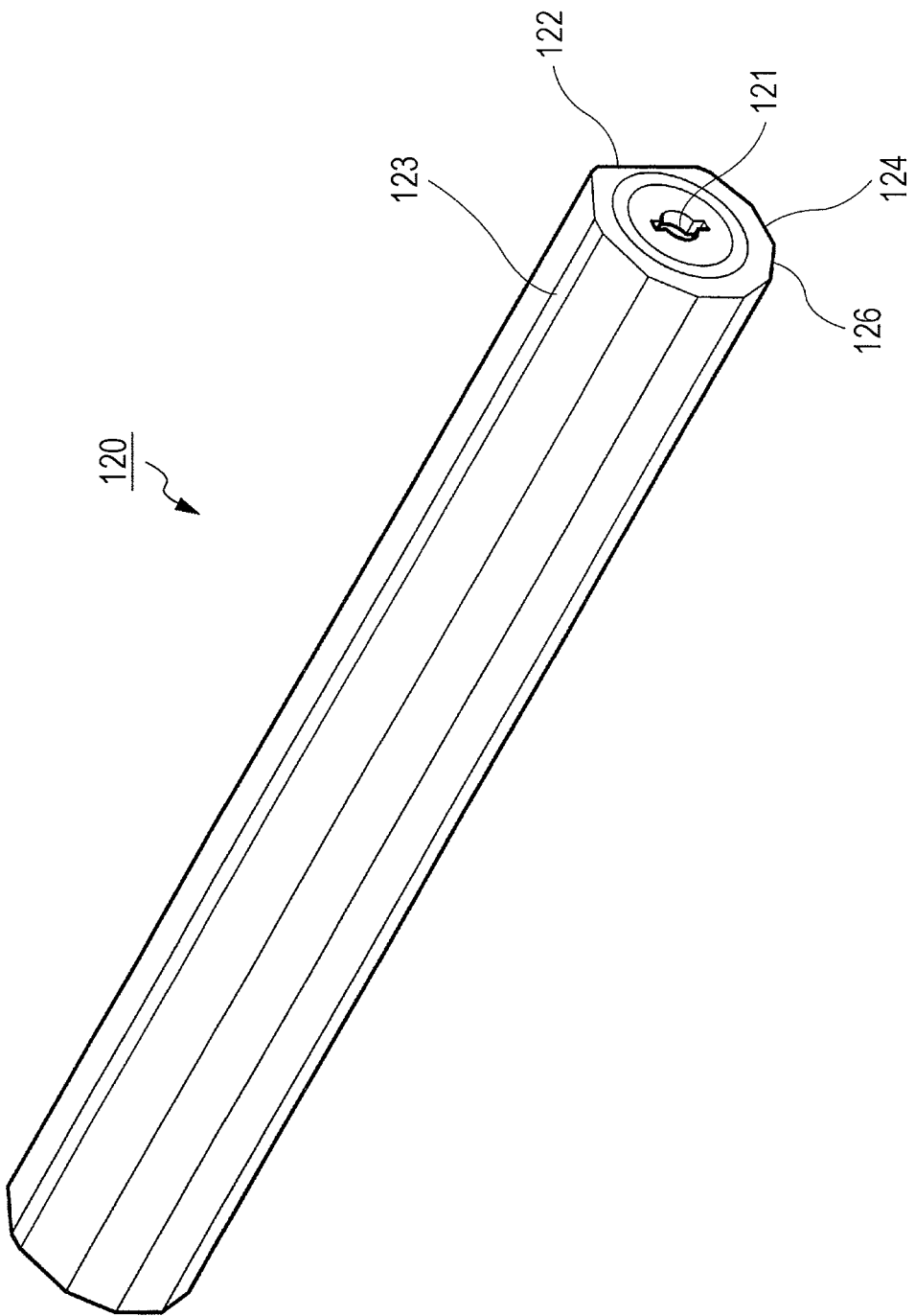
FIG. 4 illustrates a reading accuracy measurement unit.

FIG. 4 illustrates the reading accuracy measurement unit 120.

In this exemplary embodiment, the reading accuracy measurement unit 120 may be a roller shaped into a cylindrical dodecahedron having 12 side surfaces. The 12 side surfaces serve as various measurement surfaces for adjusting the image reading device 100. The reading accuracy measurement unit 120 may be composed of, for example, aluminum, and the 12 surfaces may be formed by cutting. In order to prevent or reduce the occurrence of measurement variation, the reading accuracy measurement unit 120 may be formed by applying black alumite treatment to the surfaces of the reading accuracy measurement unit 120 and adhering a measurement chart used as a reflection plane to a predetermined surface by using a double-sided adhesive tape or any other suitable adhesive. The reading accuracy measurement unit 120 has a shaft portion 121 connected to a stepping motor (not illustrated) and a reduction gear (not illustrated), and is rotatable about the shaft portion 121. Thus, a measurement surface necessary to adjust the image reading device 100 may be directed to the side of the sheet of paper that faces the transport surface.

In this exemplary embodiment, measurement surfaces 124 and 126 are provided as the measurement surfaces. The measurement surfaces 124 and 126 are provided with plural reflection planes of predetermined different colors. In this exemplary embodiment, a white reference plate used for color calibration for a white balance is provided on the measurement surface 124 as a reflection plane, which will be described in detail below. Further, The measurement surface 126 has as a reflection plane a color reference plate including various color patches used for color calibration to calibrate a predetermined color.

In this exemplary embodiment, the reading accuracy measurement unit 120 has a retracting surface 122 and a paper holding surface 123 in addition to the measurement surfaces 124 and 126.

The retracting surface 122 is a surface for preventing or reducing interference between the reading accuracy measurement unit 120 and a sheet of paper. In this exemplary embodiment, for example, the image reading device 100 operates for the calibration of the image reading device 100 or the image forming units 11 when the power of the image forming apparatus 1 is turned on, which will be described in detail below. Thus, the image reading device 100 does not operate in the normal image forming operation, and a sheet of paper merely passes through the image reading device 100. In the normal image forming operation, therefore, the reading accuracy measurement unit 120 may be retracted at a position out of contact with a sheet of paper. The retracting surface 122 may be a surface having a larger area than the other measurement surfaces, and may be produced by cutting by a larger amount than the other surfaces when forming the 12 side surfaces of the reading accuracy measurement unit 120. When the reading accuracy measurement unit 120 rotates and the retracting surface 122 is directed to the side of the sheet of paper that faces the transport surface, the retracting surface 122 is below the transport surface, and the sheet of paper and the retracting surface 122 do not interfere with each other. Thus, the reading accuracy measurement unit 120 may be retracted at a position out of contact with a sheet of paper in the normal image forming operation.

The paper holding surface 123 is a surface directed to the side of a sheet of paper that faces the transport surface for the calibration of the image forming unit 11. The paper holding surface 123 is formed so as to be slightly above the side of a sheet of paper that faces the transport surface when the paper holding surface 123 is directed to the side of the sheet of paper that faces the transport surface. When the sheet of paper moves through the image reading device 100, the sheet of paper is guided together with the guide surface 101 to allow the sheet of paper to pass so as to more fit to a predetermined transport surface. Thus, an image on the sheet of paper may be read with less variation.

Referring back to FIG. 3, the optical system 130 includes mirrors 131, 132, and 133, an aperture 134, and a lens 135. Light reflected from a sheet of paper or light reflected from a measurement surface of the reading accuracy measurement unit 120 is reflected by the mirrors 131, 132, and 133, and the aperture 134 reduces the amount of light to a predetermined value. The aperture 134 has a window portion 134a in a center portion thereof, and is rotatable in the arrow direction about the window portion 134a. Thus, the amount of light passing through the window portion 134a may be changed by rotating the aperture 134 to reduce the amount of light to a predetermined value. Then, the light is linearly condensed by the lens 135, and an image is formed on the CCD sensor 140. Here, light may be condensed in a direction, for example, perpendicular to the plane of FIG. 3.

The CCD sensor 140 has CCDs 141 linearly arranged as an example of a light receiving unit that receives light reflected by a sheet of paper. In this exemplary embodiment, CCDs 141 corresponding to red (R), green (G), and blue (B) colors are arrayed in three rows so that an image recorded on a sheet of paper may be measured using RGB colors. In other words, a three-line color CCD sensor is used. Light received by the CCDs 141 is photoelectrically converted into electric charge. The electric charge is transferred to a generation unit 142.

The generation unit 142 detects the electric charge transferred from the CCDs 141 to generate electrical signals. The electrical signals serve as light intensity data (light intensity values) that is information for adjusting the image forming unit 11. That is, the generation unit 142 generates information for adjusting an image formed on a sheet of paper from the light received by the CCDs 141. The information corresponds to light intensity data. Since the CCDs 141 are color CCDs of three, red (R), green (G), and blue (B) colors, the generation unit 142 generates an R signal, a G signal, and a B signal that are pieces of light intensity data corresponding to the respective colors.

Description of Measurement Surface

Next, a measurement surface provided in the reading accuracy measurement unit 120 will be described in more detail.

Figure 5:
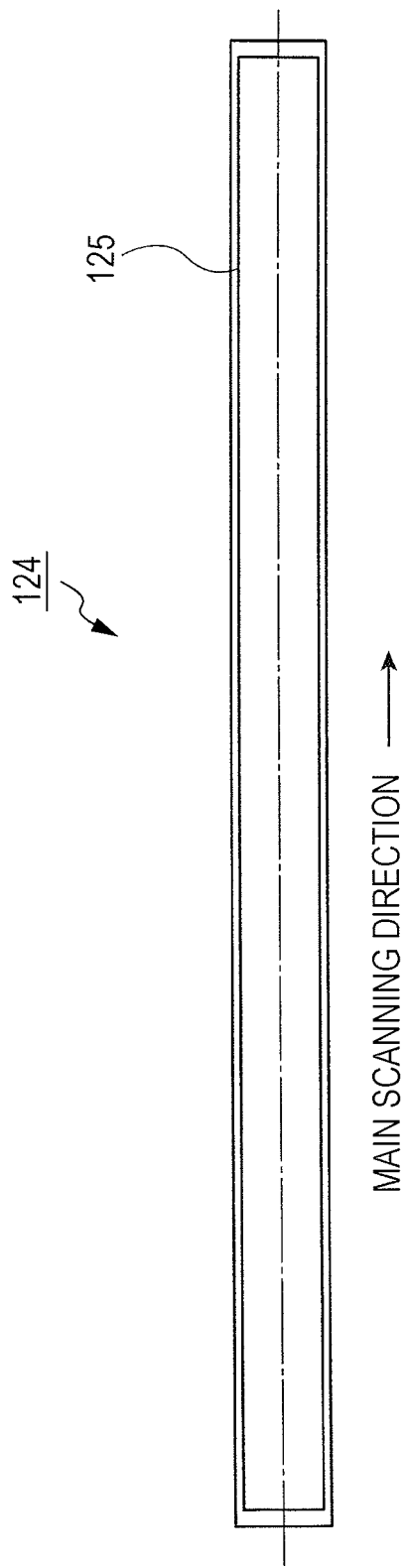
FIG. 5 illustrates a measurement surface having a white reference plate as an example of a reflection plane used for color calibration for a white balance.

FIG. 5 illustrates the measurement surface 124 having a white reference plate as an example of a white reference member used for color calibration for a white balance.

As illustrated in FIG. 5, the measurement surface 124 has a white reference plate 125 formed of a predetermined white film. In this exemplary embodiment, a white polyester film or any other suitable material may be used as the white reference plate 125. The white reference plate 125 may be fixed to the measurement surface 124 by using, for example, a double-sided adhesive tape or any suitable adhesive.

With the use of the white reference plate 125, in this exemplary embodiment, for example, shading correction may be performed. That is, non-uniformity in the light intensity distribution along the length of the tube of the xenon fluorescent lamps 111a and 111b of the light source 110 (i.e., in the main scanning direction) is corrected.

Figure 6:
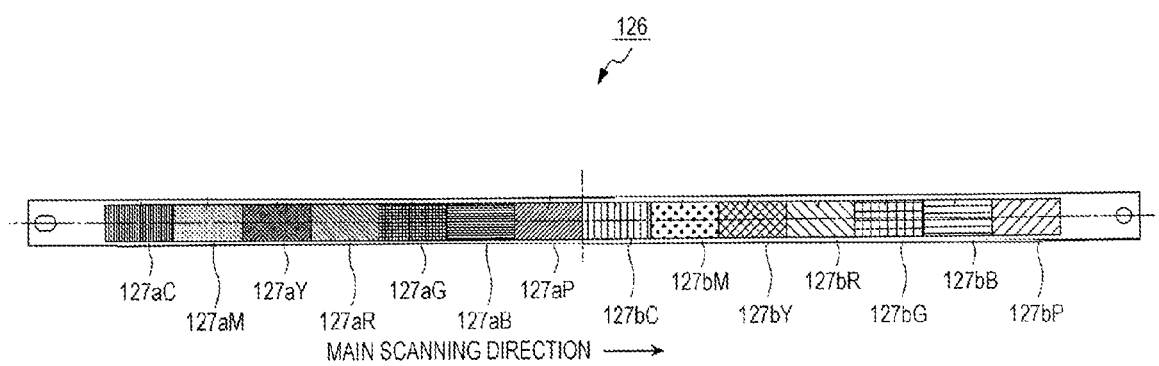
FIG. 6 illustrates a measurement surface having color reference plates as an example of a reflection plane used for color calibration to calibrate a color.

FIG. 6 illustrates the measurement surface 126 having a color reference plate as an example of a color reference member used for color calibration to calibrate a predetermined color.

The measurement surface 126 illustrated in FIG. 6 has plural color reference plates of predetermined different colors arranged in the longitudinal direction of the measurement surface 126.

As illustrated in FIG. 6, in this exemplary embodiment, 14 color patches of different colors may be used as color reference plates. Each of the color reference plates may have a size of, for example, 10 mm×20 mm, and are arrayed in one line in the main scanning direction. Among them, seven color reference plates 127aC, 127aM, 127aY, 127aR, 127aG, 127aB, and 127aP arranged on one side with respect to the center portion of the measurement surface 126 in its longitudinal direction are so-called highlight color reference plates, and are color reference plates having a reflectance of 20%. In this exemplary embodiment, the color reference plates 127aC, 127aM, 127aY, 127aR, 127aG, 127aB, and 127aP are of cyan (C) color, magenta (M) color, yellow (Y) color, red (R) color, green (G) color, blue (B) color, and process black (P) color, respectively.

Seven color reference plates 127bC, 127bM, 127bY, 127bR, 127bG, 127bB, and 127bP provided on the other side with respect to the center portion of the measurement surface 126 in its longitudinal direction are so-called shadow color reference plates, and are color reference plates having a reflectance of 60%. The colors are arranged in order similar to that of the highlight color reference plates. In this exemplary embodiment, the color reference plates 127aC (C 20%), 127aM (M 20%), 127aY (Y 20%), 127aR (R 20%), 127aG (G 20%), 127aB (B 20%), 127aP (P 20%), 127bC (C 60%), 127bM (M 60%), 127bY (Y 60%), 127bR (R 60%), 127bG (G 60%), 127bB (B 60%), and 127bP (P 60%) described above are also collectively referred to as "color reference plates 127".

The white reference plate 125 described with reference to FIG. 5 may have variation in characteristics (machine variation), such as non-uniformity in reflectance. Variation in characteristics of the white reference plate 125 may cause values read by image reading devices 100 that read an image to differ from one image reading device 100 to another. In this exemplary embodiment, a machine-variation correction formula that is a correlation formula representing variation in characteristics of the white reference plate 125 is derived on the basis of the light intensity value generated when light is emitted to the color reference plate 127 from the light source 110, and the read value is corrected using the machine-variation correction formula to prevent or reduce the variation between values read by image reading devices 100.

Description of Machine-Variation Correction Formula for White Reference Plate

Next, a procedure for determining a machine-variation correction formula for the white reference plate 125 will be described.

Here, a machine-variation correction formula at the time (T0) when the xenon fluorescent lamps 111a and 111b of the light source 110 are started to be turned on is determined.

At time T0, the 14 color reference plates 127 provided in an actual machine for which a machine-variation correction formula is to be determined are irradiated with light from the light source 110. Then, an R signal, a G signal, and a B signal for each of the color reference plates 127 are obtained as light intensity data. Then, a list of values with x representing the obtained signals and y representing intended target values (standard values) is created.

An example of the light intensity data obtained in the manner described above is given in Table 1 below.

TABLE 1

| i | Color reference plate | Actual machine (x) | | | Target value (y) | | |
|---|---|---|---|---|---|---|---|
| | | R signal | G signal | B signal | R signal | G signal | B signal |
| 1 | C 20% | 450 | 700 | 842 | 450 | 700 | 850 |
| 2 | M 20% | 650 | 459 | 594 | 650 | 450 | 600 |
| 3 | Y 20% | 998 | 859 | 545 | 950 | 850 | 550 |
| 4 | R 20% | 679 | 455 | 357 | 700 | 450 | 350 |
| 5 | G 20% | 400 | 534 | 432 | 400 | 550 | 450 |
| 6 | B 20% | 388 | 380 | 630 | 400 | 400 | 600 |
| 7 | P 20% | 368 | 368 | 285 | 350 | 350 | 300 |
| 8 | C 60% | 51 | 297 | 550 | 50 | 300 | 550 |
| 9 | M 60% | 455 | 48 | 149 | 450 | 50 | 150 |
| 10 | Y 60% | 891 | 707 | 200 | 900 | 700 | 200 |
| 11 | R 60% | 490 | 48 | 52 | 500 | 50 | 50 |
| 12 | G 60% | 51 | 208 | 97 | 50 | 200 | 100 |
| 13 | B 60% | 50 | 49 | 144 | 50 | 50 | 150 |
| 14 | P 60% | 48 | 51 | 52 | 50 | 50 | 50 |

First, the x value and y value for the R signal are substituted into Formula (1) below to determine the value a:

$$a = \frac{n\sum x_i y_i - \sum x_i \sum y_i}{n\sum x_i^2 - (\sum x_i)^2} \quad (1)$$

where i corresponds to the value i given in Table 1. That is, for example, x1 represents the value for the R signal with respect to C 20% (here, 450), and y10 represents the value for the R signal with respect to Y 60% (here, 900).

The value a may be the value a in a linear function y=ax (a: slope) as a machine-variation correction formula where y denotes the target light intensity data value and x denotes the light intensity data of the actual machine at time T0.

In the case of x and y given in Table 1, a=0.986327. Thus, the machine-variation correction formula is y=0.986327x.

Similarly, a machine-variation correction formula is also derived for each of the G signal and the B signal used as light intensity data. In this exemplary embodiment, a=0.994348 is obtained for the G signal and a=0.996788 is obtained for the B signal. The value a is 1 if the white reference plate 125 has no variation in characteristics. If the white reference plate 125 has variation in characteristics, the value a is greater than 1 when the reflectance is higher than that of a standard one, and the value a is less than 1 when the reflectance is lower than that of the standard one. As may be seen, the white reference plate 125 according to this exemplary embodiment has a reflectance less than a standard one.

Figure 7A:
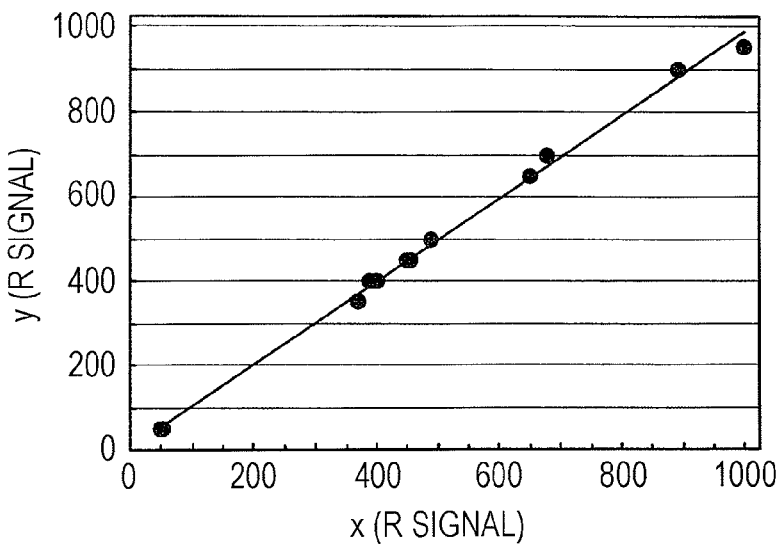
FIGS. 7A to 7C are graphs on which x and y values and machine-variation correction formulas are plotted.
Figure 7B:
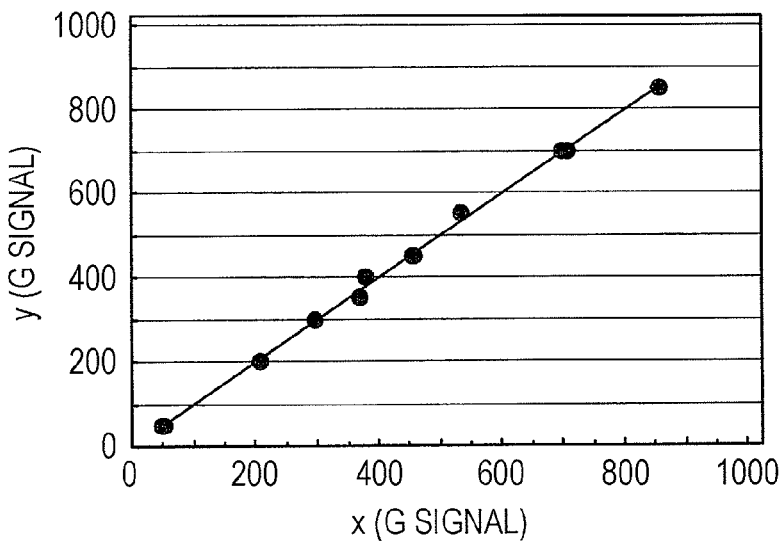
Figure 7C:
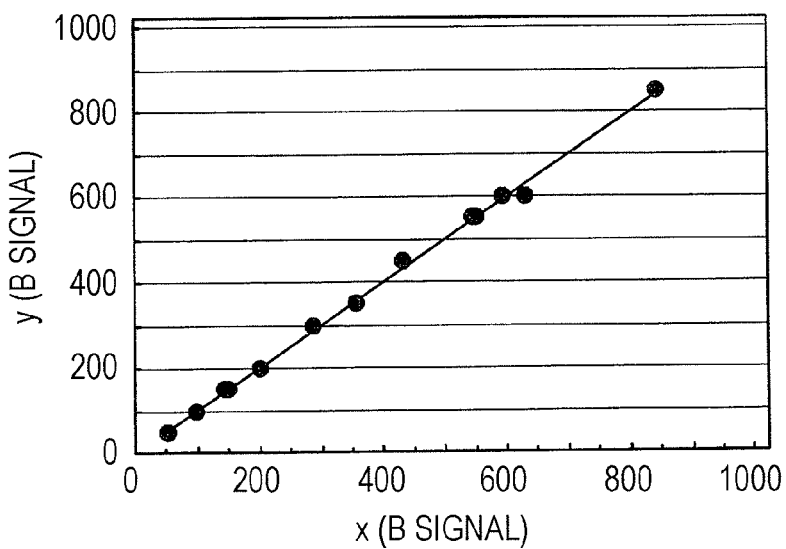

The machine-variation correction formulas corresponding to the three R, G, and B colors may be determined in the manner described above. FIGS. 7A to 7C illustrate graphs on which x and y values and the machine-variation correction formulas are plotted. FIG. 7A illustrates the machine-variation correction formula for red (R). FIG. 7B illustrates the machine-variation correction formula for green (G), and FIG. 7C illustrates the machine-variation correction formula for blue (B).

Accordingly, with the use of the color reference plates 127 that are reference plates having different reflectances, a machine-variation correction formula for the white reference plate 125 is derived. The machine-variation correction for the white reference plate 125 is performed using the machine-variation correction formula.

In practice, the machine-variation correction for the white reference plate 125 is performed by multiplying the R, G, and B values read as light intensity data of an image by correction coefficients k. Thus, the read values are corrected to more accurate values. Each of the correction coefficients k is the reciprocal of the value a, and is defined by Formula (2):

$$k=1/a \qquad (2)$$

In this exemplary embodiment, the correction coefficient k for R is 1.013863. The correction coefficient k for G is 1.005684, and the correction coefficient k for B is 1.003222.

In the example described above, the machine-variation correction formulas are based on a linear function y=ax by way of example. However, this is not to be taken in a limiting sense, and the machine-variation correction formulas may be based on a linear function y=ax+b (a: slope, b: intercept), or by a higher order function such as a quadratic function $y=ax^2$. If a linear function y=ax is determined as a machine-variation correction formula, 14 points are used in the above example. However, at least two points may be used to determine the machine-variation correction formulas. That is, two color reference plates 127 may be used to determine the machine-variation correction formulas.

In the above example, furthermore, the machine-variation correction formulas corresponding to the three R, G, and B colors are determined. However, the machine-variation correction formulas corresponding to all the three colors may not necessarily be determined, and a machine-variation correction formula for at least one of the R, G, and B colors may be determined to correct a value read by the image reading device 100. In this case, the G color is close to the human visual characteristics to brightness. Thus, a machine-variation correction formula derived from the G signal may be included.

In the above example, furthermore, the light intensity data at time T0 is used. However, this is not to be taken in a limiting sense, and the light intensity data at any accumulative turn-on time may be used. In some cases, the spectral radiation characteristics of light emitted from the xenon fluorescent lamps 111a and 111b of the light source 110 may change with time. In such cases, a value read by the image reading device 100 that reads an image changes. Therefore, a machine-variation correction formula that also takes into account any variation caused by the temporal change of the spectral radiation characteristics of light emitted from the xenon fluorescent lamps 111a and 111b is used.

The correction of a read value caused by the temporal change of the spectral radiation characteristics of light emitted from the xenon fluorescent lamps 111a and 111b may be performed by using any other method, and a machine-variation correction formula that does not take into account the above correction may be determined. In such cases, for example, a color reference plate 127 having an achromatic color may be used because it is less susceptible to the influence of the temporal change of the spectral radiation characteristics of light emitted from the xenon fluorescent lamps 111a and 111b. In this exemplary embodiment, two color reference plates 127aP (P 20%) and 127bP (P 60%) having process black colors with different reflectances may be used to derive a machine-variation correction formula. Furthermore, since the temporal change of the spectral radiation characteristics of light emitted from the xenon fluorescent lamps 111a and 111b is more likely to occur in a blue area, a method using a machine-variation correction formula derived from the R signal may be adopted because it is less susceptible to the influence of the blue area.

Next, a specific method for using a machine-variation correction formula, as described above, will be described.

FIG. 8 is a flowchart illustrating a first example of correcting a read value by the image reading device 100 using a machine-variation correction formula.

First, the controller 50 (see FIG. 1) of the image forming apparatus 1 transmits a start command to the image reading device 100 (step 101). The start command transmitted to the image reading device 100 is received by the processing unit 150 (see FIG. 3) of the image reading device 100. The processing unit 150 first determines whether or not the light source 110 is in a turn-on state (step 102). If the light source 110 is not in the turn-on state, the processing unit 150 turns on the light source 110 (step 103). Under the turn-on state of the light source 110, the processing unit 150 performs gain/offset adjustment of the CCD sensor 140 (step 104). Then, the processing unit 150 causes the reading accuracy measurement unit 120 to rotate to direct the measurement surface 124 having the white reference plate 125 to the side of a sheet of paper that faces the transport surface. Then, light is emitted to the white reference plate 125 from the light source 110, and light intensity data based on the white reference plate 125 is obtained (step 105). Then, shading correction is performed (step 106). Then, the processing unit 150 causes the reading accuracy measurement unit 120 to rotate again to direct the measurement surface 126 having the color reference plates 127 to the side of the sheet of paper that faces the transport surface. Then, light is emitted to the color reference plates 127 from the light source 110, and light intensity data based on the color reference plates 127 is obtained (step 107).

Then, the processing unit 150 derives a machine-variation correction formula based on the light intensity data obtained from the color reference plates 127 (step 108). Therefore, the calibration of the image reading device 100 is completed, and the preparation for reading an image is completed. Then, the processing unit 150 transmits a reading preparation completion command to the controller 50 (step 109).

Upon receipt of the reading preparation completion command, the controller 50 prints a test chart using the image forming device 10 (see FIG. 1), and the printed test chart is transported to the image reading device 100 (step 110). Then, the image reading device 100 reads the test chart, and the read value as light intensity data is transmitted to the processing unit 150 (step 111). Then, the processing unit 150 performs machine-variation correction for the read value using the machine-variation correction formula (step 112). Here, the test chart has printed thereon a test pattern of the colors described above, i.e., cyan (C) color, magenta (M) color, yellow (Y) color, red (R) color, green (G) color, blue (B) color, and process black (P) color. Then, machine-variation correction is performed on the respective colors using the respective machine-variation correction formulas for red (R), green (G), and blue (B). The test chart also has printed thereon a test pattern of black (K) color as black in addition to process black (P) color. The machine-variation correction for black (K) color may be performed using the machine-variation correction formula for process black (P) color.

Then, the processing unit 150 transmits the corrected read value to the controller 50 (step 113). The controller 50 performs various kinds of correction and transformation parameter correction based on the corrected read value in order to adjust the toner images formed by the image forming units 11 (step 114). Accordingly, the calibration of the image forming units 11 is performed.

In this exemplary embodiment, therefore, the correction of a value read by the image reading device 100 caused by variation in characteristics of the white reference plate 125 is performed using a machine-variation correction formula. The machine-variation correction for the white reference plate 125 using the color reference plates 127 may provide a higher accuracy of the machine-variation correction for the white reference plate 125 than that using, for example, white paper or the like. The above process is performed before the shipment of image forming apparatuses 1, thus preventing or reducing the variation between values read by image reading devices 100 and facilitating matching of the read values.

Figure 9:
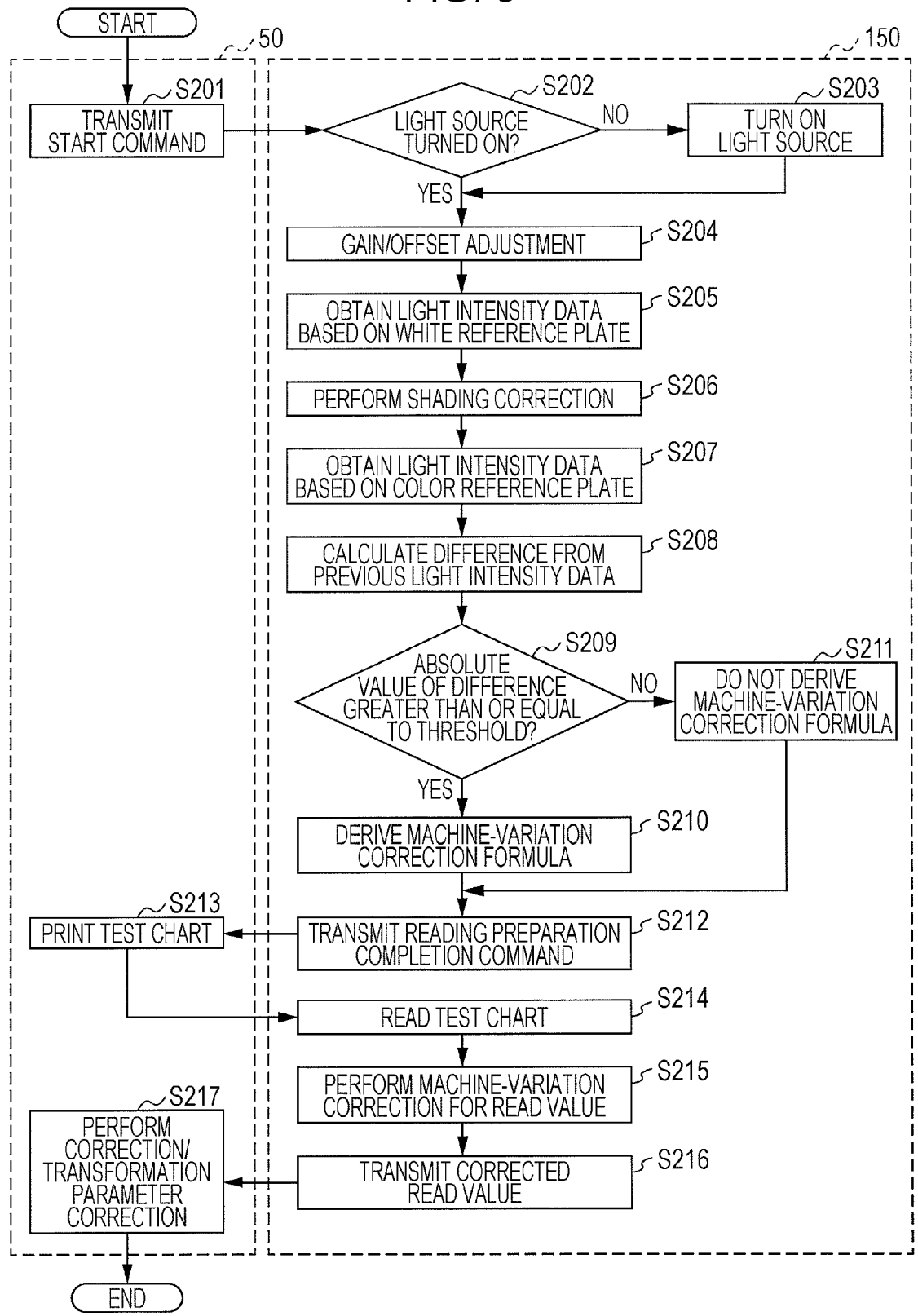
FIG. 9 is a flowchart illustrating a second example of correcting a value read by the image reading device using a machine-variation correction formula.

FIG. 9 is a flowchart illustrating a second example of correcting a read value by the image reading device 100 using a machine-variation correction formula.

The processing of steps 201 to 207 is similar to the processing of steps 101 to 107 described with reference to FIG. 8.

In FIG. 9, after obtaining the light intensity data based on the color reference plates 127, the processing unit 150 determines the difference between the light intensity data and the previous light intensity data obtained in the previous derivation of the machine-variation correction formula (step 208). Then, the processing unit 150 determines whether or not the absolute value of the difference is greater than or equal to a predetermined threshold (step 209). If the absolute value of the difference is greater than or equal to the predetermined threshold, a machine-variation correction formula is derived (step 210). Then, the subsequent processing of steps 212 to 217 is performed. The processing of steps 212 to 217 is similar to the processing of steps 109 to 114 described with reference to FIG. 8.

If it is determined in step 209 that the absolute value of the difference is less than the predetermined threshold, no machine-variation correction formula is derived (step 211). That is, the previous derived machine-variation correction formula is used without updating the machine-variation correction formula. Then, the subsequent processing of steps 212 to 217 is performed.

With the above process, a machine-variation correction formula is updated as necessary. That is, a machine-variation correction formula is updated if it is determined that the update is of statistical value.

Figure 10:
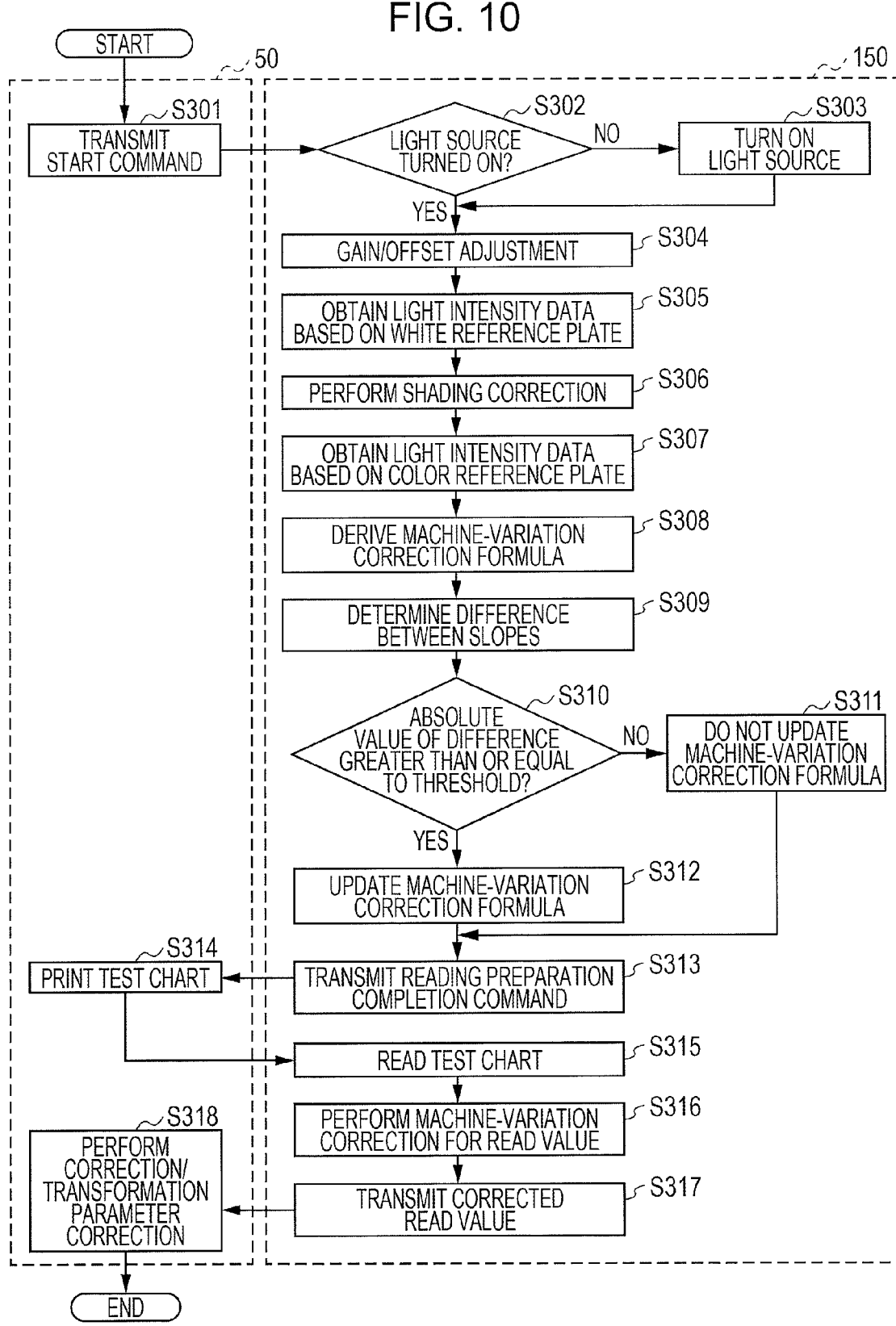
FIG. 10 is a flowchart illustrating a third example of correcting a value read by the image reading device using a machine-variation correction formula.

FIG. 10 is a flowchart illustrating a third example of correcting a read value by the image reading device 100 using a machine-variation correction formula.

The processing of steps 301 to 308 is similar to the processing of steps 101 to 108 described with reference to FIG. 8.

In FIG. 10, after deriving a machine-variation correction formula, the processing unit 150 determines the difference between the slope A of the machine-variation correction formula and the slope of the previous derived machine-variation correction formula (step 309). Then, the processing unit 150 determines whether or not the absolute value of the difference is greater than or equal to a predetermined threshold (step 310). If the absolute value of the difference is greater than or equal to the predetermined threshold, the machine-variation correction formula is updated (step 312). The subsequent processing of steps 313 to 318 is performed. The processing of steps 313 to 318 is similar to the processing of steps 109 to 114 described with reference to FIG. 8.

If it is determined in step 310 that the absolute value of the difference is less than the predetermined threshold, the machine-variation correction formula is not updated (step 311). That is, the previous derived machine-variation correction formula is used. Then, the subsequent processing of steps 313 to 318 is performed.

Even in this case, the machine-variation correction formula is updated as necessary.

The process performed by the processing unit 150 described above may be performed by the controller 50. In other words, the series of processes may be performed by the controller 50 without using the processing unit 150.

The image reading device 100 described above in detail is a device that adjusts the image forming units 11 of the image forming apparatus 1. However, this is not to be taken in a limiting sense. For example, an image reading device such as a typical scanner in which a sheet of paper having an image formed thereon, such as a document, is placed on a platen glass and reflected light from the document irradiated with light from a light source is read by a CCD sensor or the like may also be used.

Furthermore, the image reading device 100 described above in detail has been described in the context of a device used in the image forming apparatus 1 that forms an image by forming a toner image. However, this is not to be taken in a limiting sense. For example, the image reading device 100 may also be used in an image forming apparatus that forms an image using an inkjet method.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image reading device comprising:
a light source that configured to emit light to a recording medium on which an image is formed;
a light receiving unit configured to receive light reflected by the recording medium;
a generation unit configured to generate a light intensity value from the light received by the light receiving unit;
a white reference member used for color calibration for a white balance;
a color reference member used for color calibration to calibrate a predetermined color; and
a processing unit configured to determine a difference between current and former light intensity values generated when light is emitted to the color reference member, and to derive, in response to the difference being greater than a predetermined value, a correlation formula, which is based upon a variation in physical characteristics of the white reference member, by using the current light intensity value.

2. The image reading device according to claim 1, wherein the color reference member includes at least two color reference members, and
wherein the correlation formula is a function derived when the at least two color reference members are used.

3. The image reading device according to claim 2, wherein the correlation formula is a function between a light intensity value generated when light is emitted to the color reference member from the light source and a predetermined standard value.

4. The image reading device according to claim 3, wherein the correlation formula is a function derived when the color reference member has an achromatic color.

5. The image reading device according to claim 2, wherein the correlation formula is a function derived when the color reference member has an achromatic color.

6. The image reading device according to claim 1, wherein the correlation formula is a function between a light intensity value generated when light is emitted to the color reference member from the light source and a predetermined standard value.

7. The image reading device according to claim 6, wherein the correlation formula is a function derived when the color reference member has an achromatic color.

8. The image reading device according to claim 1, wherein the correlation formula is a function derived when the color reference member has an achromatic color.

9. The image reading device according to claim 1, wherein the generation unit generates a light intensity value corresponding to red, a light intensity value corresponding to green, and a light intensity value corresponding to blue, and
wherein the processing unit derives the correlation formula based on at least one of the light intensity value corresponding to green and the light intensity value corresponding to red.

10. The image reading device according to claim 1, wherein the correlation formula scales the generated light intensity value by a value representing the variation in characteristics of the white reference member so that the generated light intensity value approximates a target light intensity value for the color reference member.

11. The image reading device according to claim 1, wherein the variation in characteristics of the white reference member is a variation in reflectance from a predetermined standard reflectance.

12. The image reading device according to claim 1, further comprising a reading accuracy measurement unit that includes a first surface with the white reference member and a second surface with the color reference member.

13. The image reading device according to claim 12, wherein the processing unit causes the reading accuracy measurement unit to rotate so the light can be emitted to the white reference member at a first time and the color reference member at a second time.

14. The image reading device according to Claim 1, wherein the image reading device reads, as a first value, the light intensity value generated when light is emitted to the color reference member, and uses the correlation formula to correct the first value to be a standardized value.

15. An image forming apparatus comprising:
an image forming unit configured to form an image on a recording medium;
a reading unit configured to read the image formed on the recording medium by image forming unit to adjust the image formed on the recording medium,
the reading unit including
a light source configured to emit light to a recording medium on which an image is formed;
a light receiving unit configured to receive light reflected by the recording medium;
a generation unit configured to generate a light intensity value from the light received by the light receiving unit;
a white reference member used for color calibration for a white balance, and
a color reference member used for color calibration to calibrate a predetermined6 color; and
a processing unit configured to determine a difference between current and former light intensity values generated when light is emitted to the color reference member, and to derive, in response to the difference being greater than a predetermined value, a correlation formula, which is based upon a variation in physical characteristics of white reference member, by using the current light intensity value.

16. The image forming apparatus according to claim 15, wherein the image forming unit includes
a toner image forming unit that forms a toner image,
a transferring unit that transfers the toner image formed by the toner image forming unit onto the recording medium, and
a fixing unit that fixes the toner image transferred by the transferring unit onto the recording medium.

17. The image forming apparatus according to claim 15, wherein the image forming apparatus reads, as a first value, the light intensity value generated when light is emitted from the light source to the color reference member of the reading unit, and uses the correlation formula to correct the first value to be a standardized value.

18. An image reading device comprising:
a light source;
a light receiving unit configured to receive light reflected by the recording medium;
a generation unit configured to generate a light intensity value from the light received by the light receiving unit;
a white reference member used for color calibration for a white balance;
a first color reference member used for color calibration to calibrate a predetermined color, the first color reference member having a first reflectance;
a second color reference member used for color calibration to calibrate the predetermined color, the second color reference member having a second reflectance; and
a processing unit configured to determine a difference between current and former light intensity values generated when light is emitted to the first and second color reference members, and to derive, in response to the difference being greater than a predetermined value, a correlation formula, which is based upon a variation on physical characteristics of the white reference member, by using the current light intensity values from light reflected from the first and second color reference members.

19. The image reading device according to claim 18, further comprising a reading accuracy measurement unit that includes a first surface with the white reference member and a second surface with the first color reference member and the second color reference member.

20. The image reading device according to claim 18, wherein the image reading device reads, as a first value, the light intensity value generated when light is emitted to the first color reference member from the light source and, as a second value, the light intensity value generated when light is emitted to the second color reference member from the light source, and uses the correlation formula to correct the first value to be a first standardized value and to correct the second value to be a second standardized value.

* * * * *